US005263728A

United States Patent [19]

Patel et al.

[11] Patent Number: 5,263,728

[45] Date of Patent: Nov. 23, 1993

[54] LOW PROFILE WHEELCHAIR

[75] Inventors: Nathalal G. Patel; Allen W. Diedrick, both of Elyria; Thomas J. Ruckowski, Berea; Harold A. Smith, Elyria; Richard J. Krupar, Oberlin; Tonya E. Jones, Vermilion, all of Ohio

[73] Assignee: Invacare Corporation, Elyria, Ohio

[21] Appl. No.: 740,434

[22] Filed: Aug. 5, 1991

[51] Int. Cl.[5] ........ B62B 7/08

[52] U.S. Cl. ........ 280/42; 280/250.1; 280/647; 280/650; 297/35; 297/423.26; 297/411.32

[58] Field of Search ........ 280/250.1, 304.1, 92, 280/647, 650, 657; 297/DIG. 4, 34, 30, 35, 41, 42, 45, 417, 433

[56] References Cited

U.S. PATENT DOCUMENTS

| | | | |
|---|---|---|---|
| 2,182,915 | 12/1939 | Connolly | 297/417 |
| 3,512,187 | 5/1970 | Thomas et al. | 297/DIG. 4 |
| 4,040,665 | 8/1977 | Wallace et al. | 297/417 |
| 4,164,354 | 8/1979 | Rodaway | 280/647 |
| 4,326,732 | 4/1982 | Gall et al. | 297/DIG. 4 |
| 4,358,125 | 11/1982 | Charles | 280/250.1 |
| 4,664,441 | 5/1987 | Collins | 297/DIG. 4 |
| 4,805,931 | 2/1989 | Slasor | 280/250.1 |
| 4,981,305 | 1/1991 | Lockard et al. | 280/250.1 |

FOREIGN PATENT DOCUMENTS

| | | | |
|---|---|---|---|
| 211376 | 2/1956 | Australia | 280/250.1 |
| 347492 | 12/1989 | European Pat. Off. | 280/647 |
| 1175684 | 12/1969 | United Kingdom | 280/647 |

*Primary Examiner*—Eric D. Culbreth

*Attorney, Agent, or Firm*—Fay, Sharpe, Beall, Fagan, Minnich & McKee

[57] ABSTRACT

A low profile wheelchair includes first and second frame portions that may be selectively spaced apart in an operative position and brought together in a stored position. Armrests, seat back, and footrests are each pivotally mounted to the frame portions so as to minimize the height and length of the wheelchair in a storage position.

14 Claims, 15 Drawing Sheets

LOW PROFILE WHEELCHAIR

BACKGROUND OF THE INVENTION

This invention pertains to the art of wheelchairs and more particularly to a collapsible, attended wheelchair.

The invention is applicable to a so-called low profile wheelchair adapted to meet a number of dimensional constraints associated, for example, with airline travel and will be described with particular reference thereto. It will be appreciated, however, that the invention has broader applications and may be advantageously employed in other environments and applications that impose similar dimensional constraints on the overall size of the wheelchair.

Wheelchairs are in widespread use in a variety of environments and particularly advantageous in assisting elderly or infirm people. One particular instance, though, in which difficulties are encountered is where dimensional constraints are applicable. By way of example, a wheelchair is often used to assist passengers embarking and disembarking from an airplane. The wheelchair is usually maintained in accessible storage at the flight gate. Alternatively, a limited number of wheelchairs are maintained on hand in a terminal servicing a number of flight gates. If a passenger requires the use of a wheelchair, an attendant assists the passenger from the flight gate to the airplane door, or vice versa.

If the passenger is embarking, the passenger is wheeled to the airplane door. Although the wheelchair may fit through the entryway of the airplane, unfortunately the aisle width does not permit the wheelchair to be moved down the aisle. The attendant and/or stewardess thus assists the passenger from the wheelchair, down the aisle and to his/her seat without benefit of the wheelchair. The wheelchair is thereafter removed from the door of the airplane and placed in storage at the airport until further use is required.

In other words, the dimensions of the airplane prohibit storage of the wheelchair on the airplane and encourages storage at the airport. The width of the aisle between the seats particularly inhibits use of the wheelchair beyond the doorway in the airplane.

Still further, even if the aisle width is not a limiting constraint, storage of the wheelchair on board during flight poses a problem. Although there has been a continued effort by manufacturers to maximize the storage area provided on the airplane, there are still storage limits placed on the size and amount of luggage which each passenger is permitted to take on board. These same storage space constraints apply to a wheelchair, particularly one which may not be used with each and every flight.

Therefore, it has been deemed desirable to find a wheelchair that collapses to a low profile, i.e., minimizes its dimensional relationships in a stored position. Further, the overall width of the wheelchair in an assembled condition must be minimized to fit through narrow aisles. Still further, the wheelchair should be easily collapsible so that once a passenger has been assisted to or from his seat, it can be conveniently and easily collapsed for storage on board the airplane.

SUMMARY OF THE INVENTION

The present invention contemplates a new and improved wheelchair that overcomes all of the above noted problems and others, easily collapses from an open to a stored position, and meets dimensional constraints in an operative or assembled position.

According to a more limited aspect of the invention, the wheelchair includes first and second frame portions that may be selectively moved toward and away from one another. A collapsible seat portion and collapsible seat back extend between the frame portions. The seat back is rotatably connected to the frame portions for rotation between a stored, first position, and an operative, second position. Means for locking the seat back in the operative position is also provided.

According to yet another aspect of the invention, first and second armrests are pivotally secured to the first and second frame portions, respectively.

According to a still further aspect of the invention, the armrests are secured to the frame portions at an area outwardly of the seat back securing area.

A principal advantage of the invention is the provision of a wheelchair that meets both operative and stored dimensional constraints for selected uses, such as in an airplane.

Another advantage of the invention resides in the ease with which the wheelchair can be manipulated between operative and, collapsed positions.

Still another advantage of the invention is realized by the light weight of the structure.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
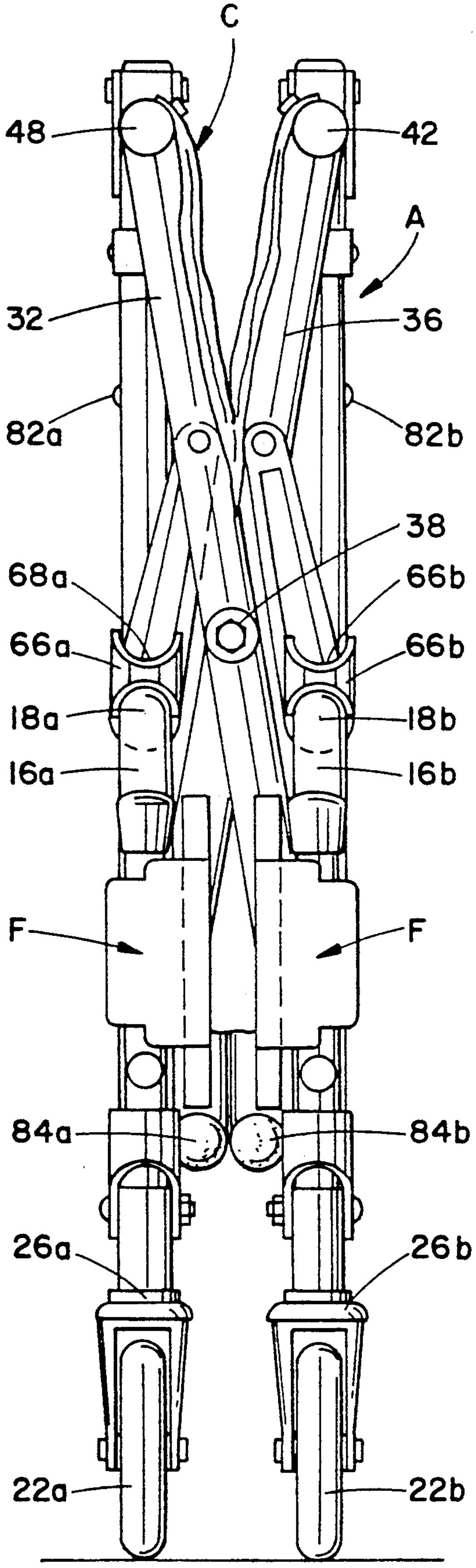
FIG. 1 is a front view of the wheelchair in a fully collapsed state.

Referring now to the drawings wherein the showings are for the purposes of illustrating the preferred embodiment of the invention only and not for purposes of limiting same, the FIGURES show a low profile, collapsible wheelchair A having a frame B that receives a seat portion c, seat back D, armrests E, and footrests F. For ease of reference and illustration, the wheelchair is a substantially symmetrical structure so that like elements on opposite sides will be described by like numerals with an additional designation "a" and "b" for right-hand and left-hand wheelchair components in any view, or description thereof, that includes both sides of the wheelchair.

More particularly, and with reference to FIGS. 1-3, the fully collapsed position of the wheelchair A will be described in greater detail. As apparent, the frame is defined by first and second frame portions 12*a*, 12*b* that are substantially identical in structure so that description of one is fully applicable to the other. Each frame portion is defined by a metal tubing assembly having a pair of vertical members 14, 16, as best illustrated in FIG. 2, disposed in generally parallel relation and interconnected by first and second horizontal members 18, 20.

The first vertical member 14 is substantially longer than the second vertical member and preferably disposed at a rear portion of the wheelchair for purposes which will become more apparent below. The members define a generally "b"-shaped configuration and, in the preferred arrangement, the horizontal member 18 and vertical member 16 are actually a continuous tubular member that is bent into a generally 90° configuration. Of course, it will be understood that other arrangements and materials of construction can be used without departing from the scope and intent of the subject invention.

Attached to the lower portions of the vertical members are front and rear wheels 22, 24. Each of the wheels is preferably freely rotatable as a result of a caster mounting arrangement 26. This allows for ease of turning and maneuverability in the attended wheelchair arrangement as is well known in the art. Preferably, and because the wheelchair is intended for operation by an attendant rather than self propelled, the wheels are rather small, on the order of six inches (6") in diameter.

The seat portion C and seat back D are shown in a collapsed state, i.e., folded in a generally U-shaped conformation, and easily received within the narrow space provided between the collapsed frame portions 12*a*, 12*b*. Preferably, the seat portion and seat back are made from a sturdy, yet flexible material such as vinyl that will easily collapse as shown in FIGS. 1-3. Further details of the structure of the seat portion and seat back will be provided below.

Figure 3:
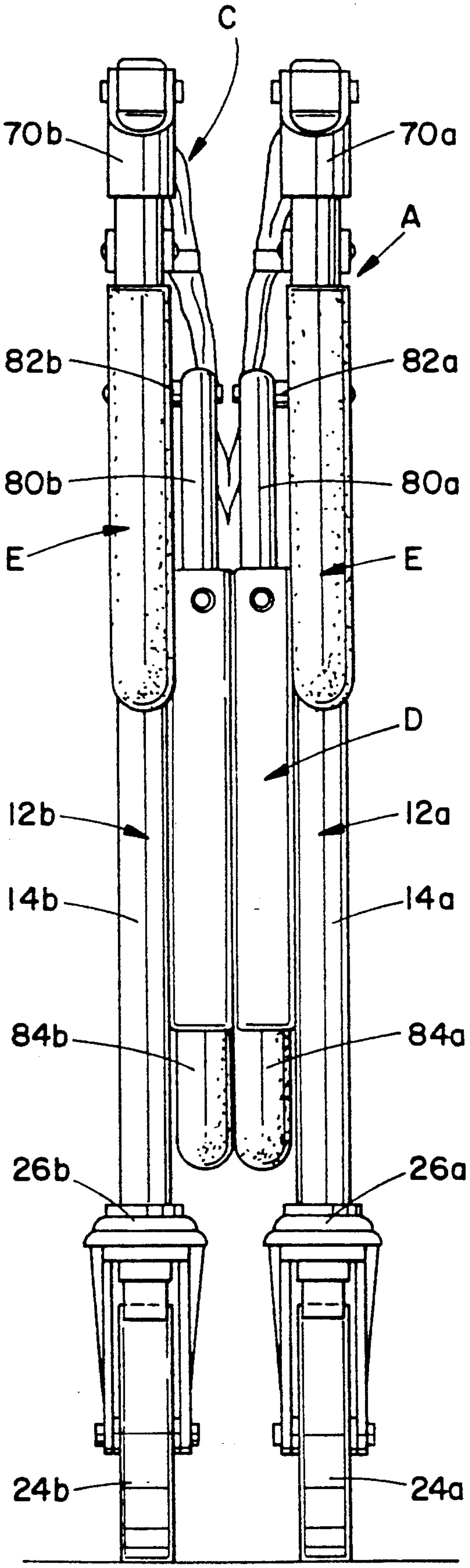
FIG. 3 is a rear view of the fully collapsed wheelchair of FIGS. 1 and 2.
Figure 2:
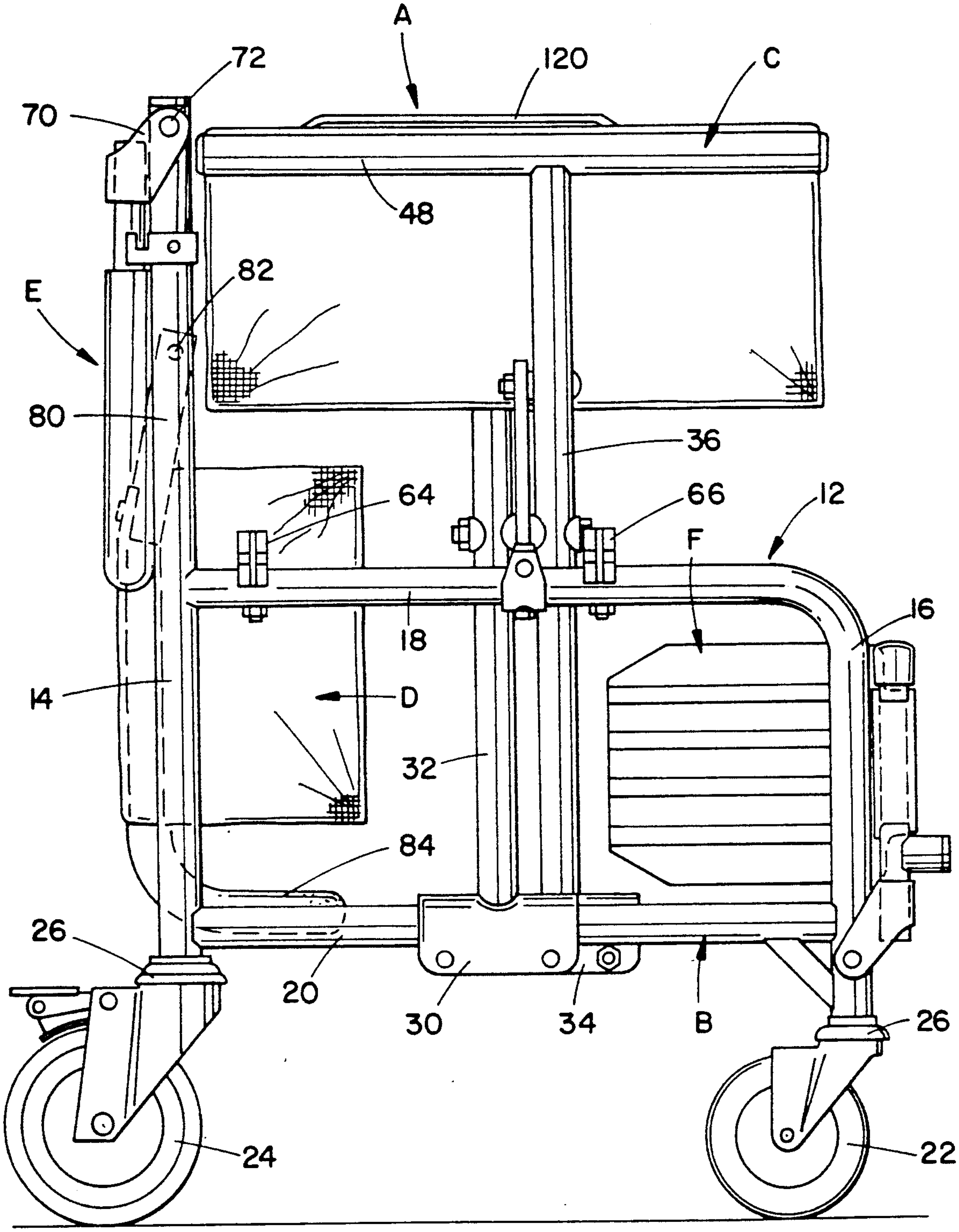
FIG. 2 is a side elevational view of the fully collapsed wheelchair of FIG. 1.

The arm rests E are also disposed in a stored position in FIGS. 1-3, extending in generally parallel relation alongside the vertical members 14. Further, the footrests F are pivoted upwardly and inwardly into a stored position and substantially received between the frame portions.

Figure 4:
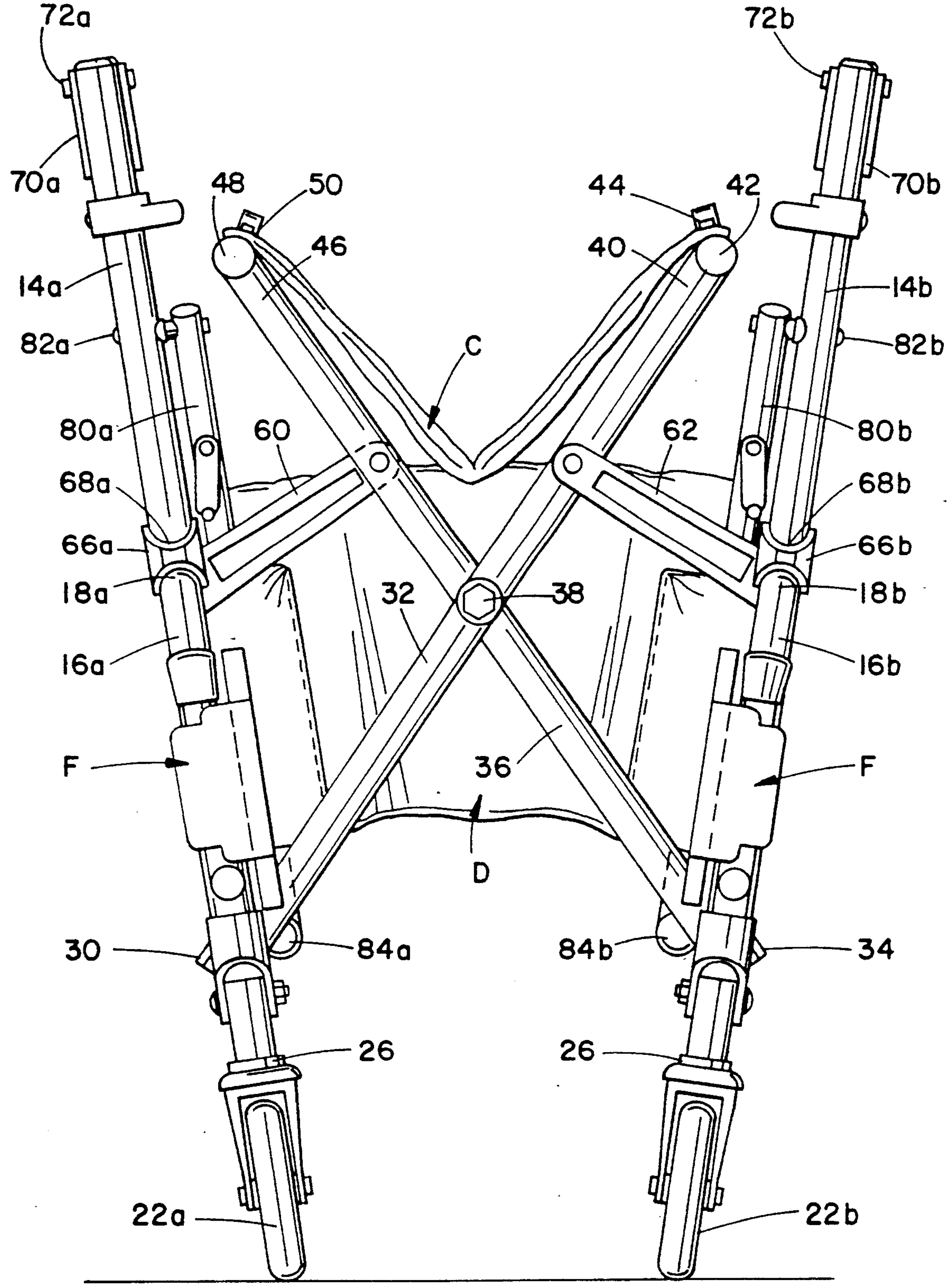
FIG. 4 is a front view of the wheelchair in a partially opened state.
Figure 5:
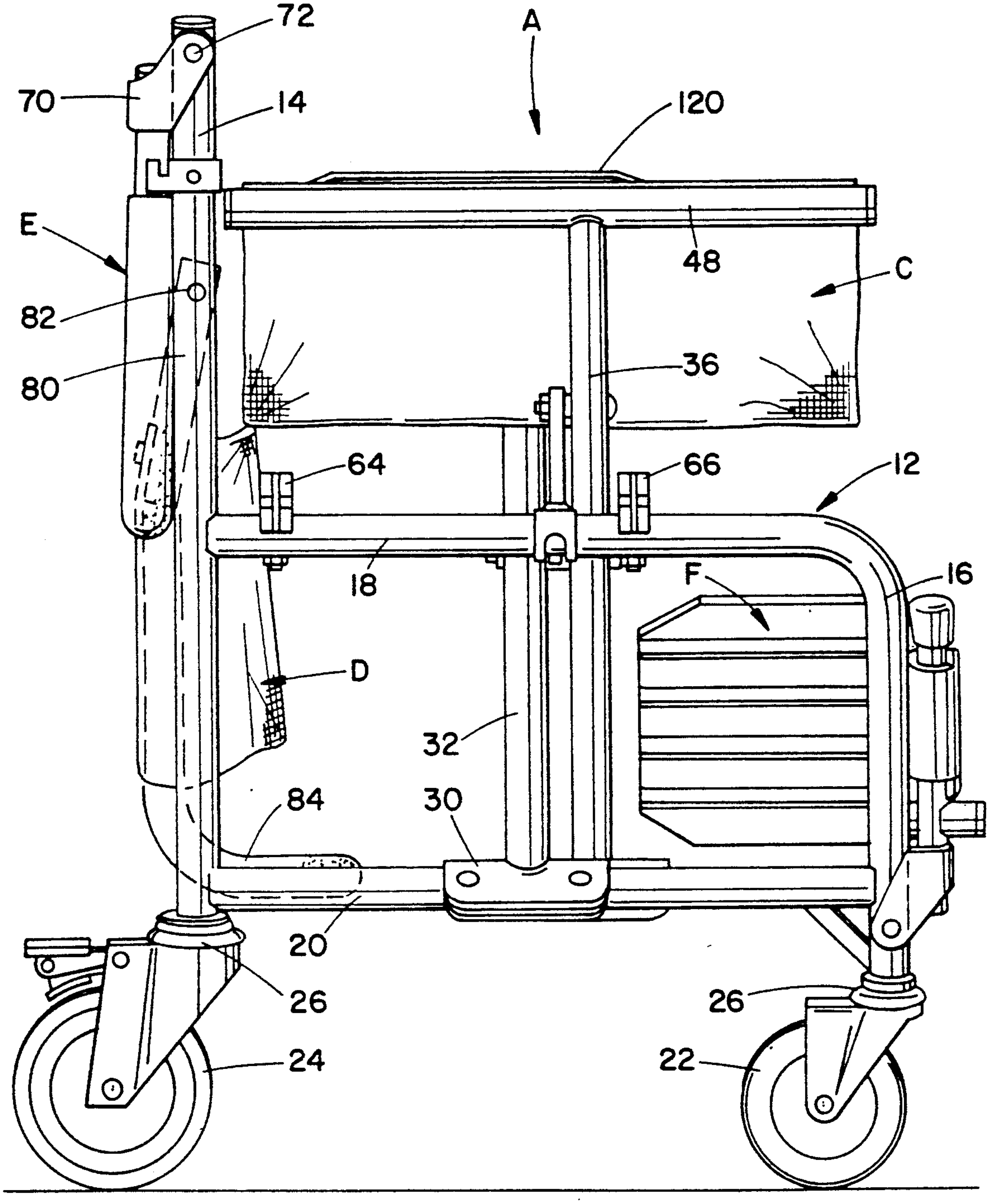
FIG. 5 is a side elevational view of the partially opened wheelchair of FIG. 4.
Figure 6:
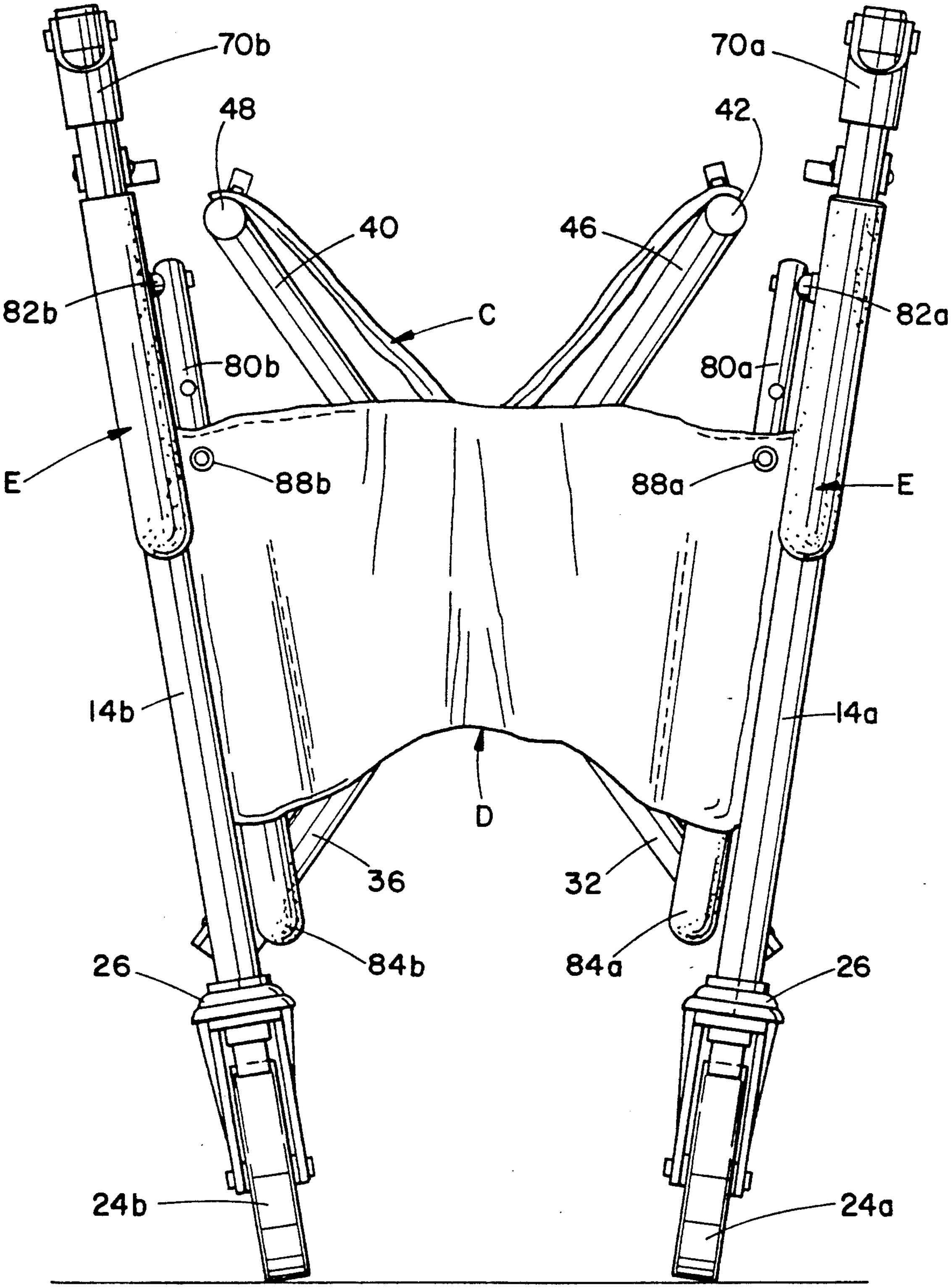
FIG. 6 is a rear view of the partially opened wheelchair of FIGS. 4 and 5.

With continued reference to FIGS. 1-3, and additional references to FIG. 4-6, the structural features of the collapsible wheelchair will be more particularly described. Approximately midway between the first and second vertical members on the second horizontal member 20 is clamped a first end 30 of a first cross member 32. Likewise, a first end 34 of a second cross member 36 is likewise secured approximately midway along the second horizontal member 20*b*. The cross members are pivotally joined along pin 38 to define a generally X-shaped configuration (FIG. 4). Second end 40 of the first cross member is secured to longitudinally extending member 42, which is, in turn, secured to the flexible material of the seat portion by means of fasteners 44. In a similar manner, second end 46 of the second cross member is secured to longitudinal member 48. The longitudinal member is secured by fasteners 50 to the opposite edge of the flexible material of the seat portion C.

Figure 7:
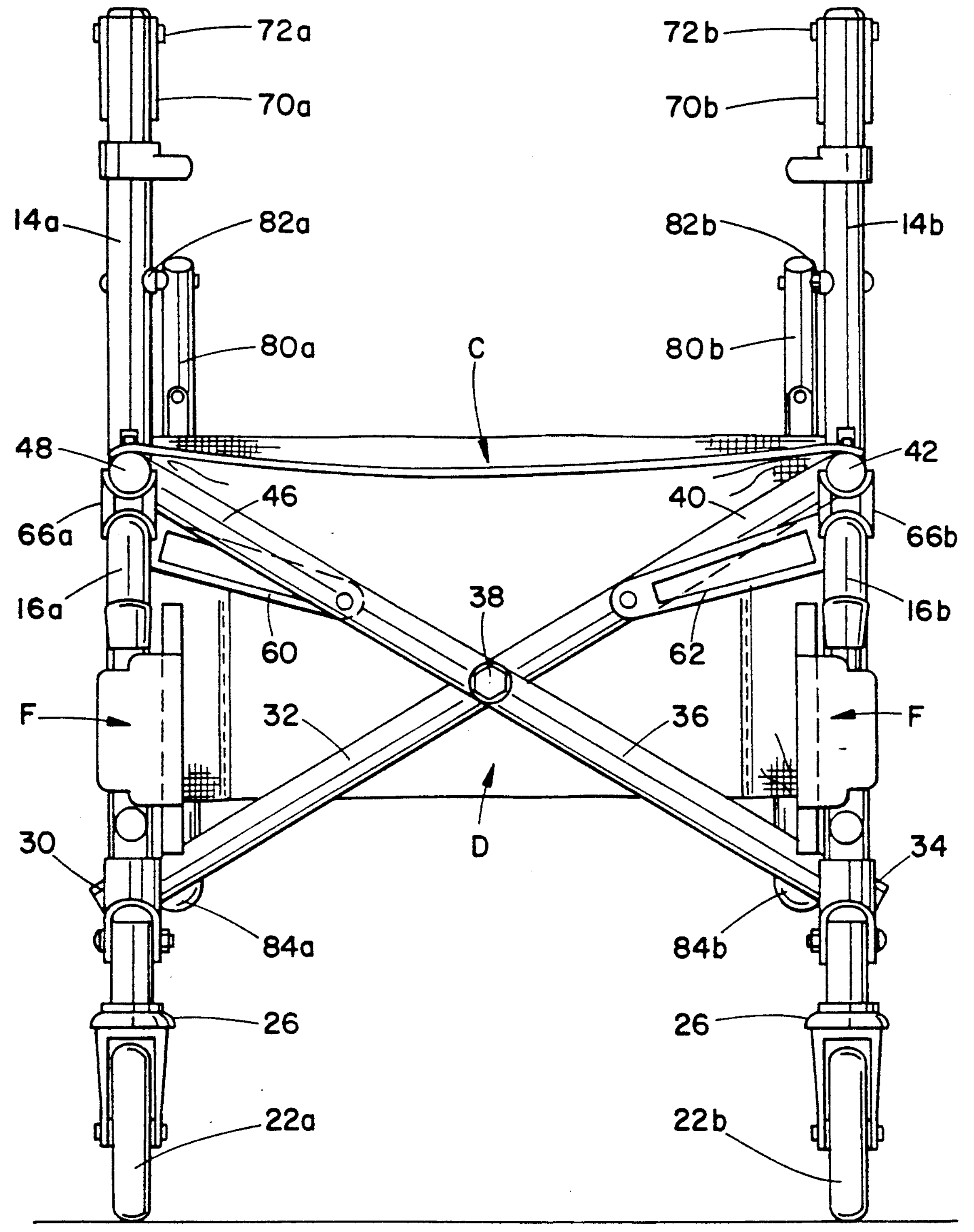
FIG. 7 is a front view of the wheelchair in an open position, but with the seat back, armrests and footrests in a stored position.

Additionally, connecting members 60, 62 extend between the first horizontal member 18*a* and first cross member 32, and first horizontal member 18*b* and second cross member 36, respectively. The connecting members provide an over-center bias to the cross members so that the cross members eventually lock into an open position as shown in FIG. 7. Preferably the each connecting member is pivotally secured at one end to its respective first horizontal member and also pivotally secured at its other end to the respective cross members. The location of the pivotal interconnection between the cross members and the connecting members is predetermined so that the over-center position is attained just as the seat portion is fully opened.

Figure 8:
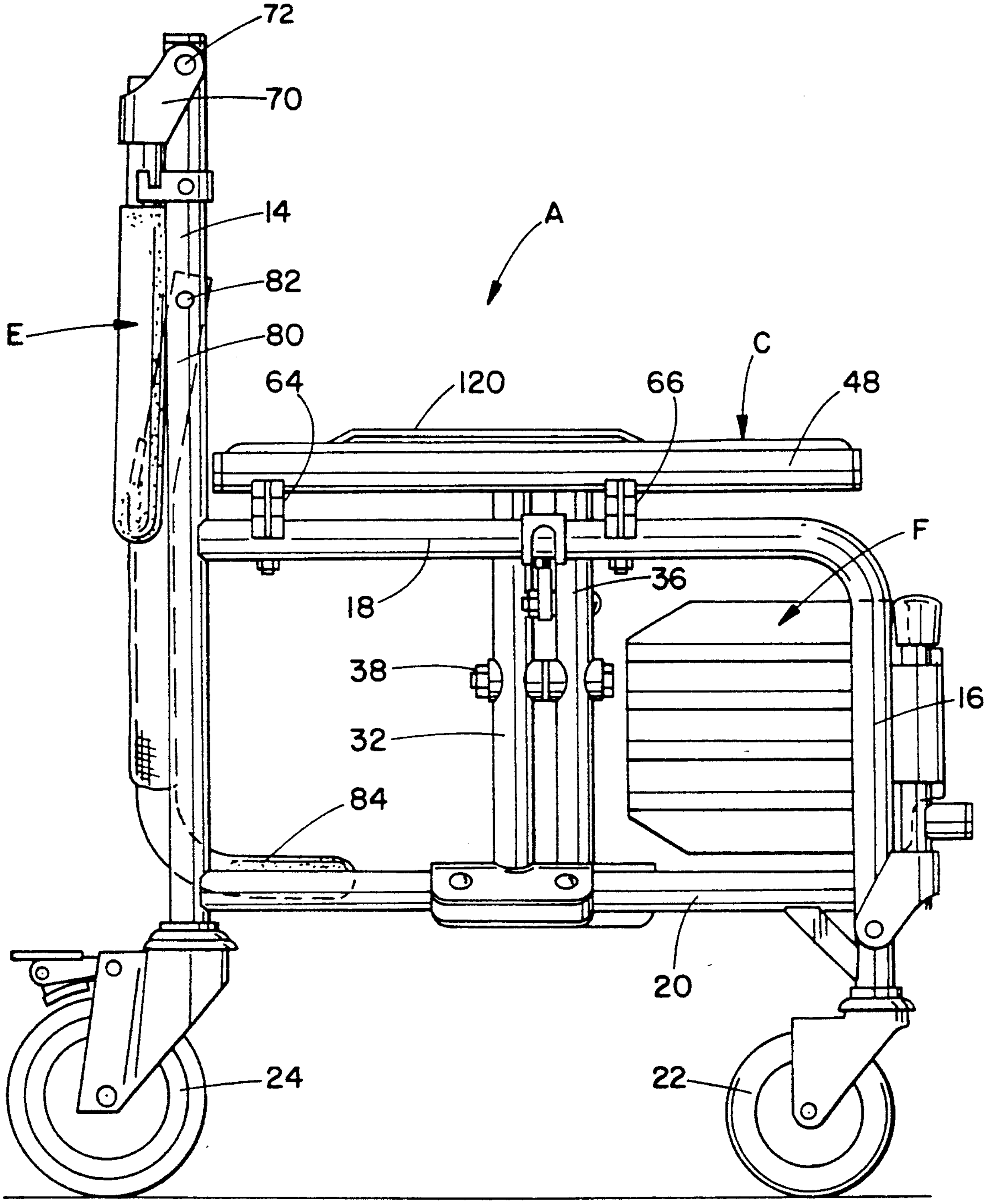
FIG. 8 is a side elevational view of the wheelchair of FIG. 7.

With continued reference to FIG. 4, and additional reference to FIG. 7, the structure and operation of stop members 64, 66 are apparent. The stop members are axially spaced along and fixedly secured to the first horizontal member 18 (FIGS. 2, 5 and 8). Each of the stop members has an upper generally U-shaped recess 68 (68*a*, 68*b*) adapted to receive the longitudinal members 42, 48 of the seat portion. The recesses extend in generally circumferential receiving relation about the longitudinal members when the frame portions are extended to their open position (FIG. 7). The lower side of each stop member is also arcuately recessed in the preferred embodiment for stable receipt on the first horizontal member, although it will be understood that other mounting arrangements can be used without departing from the scope and intent of the subject invention.

Figure 9:
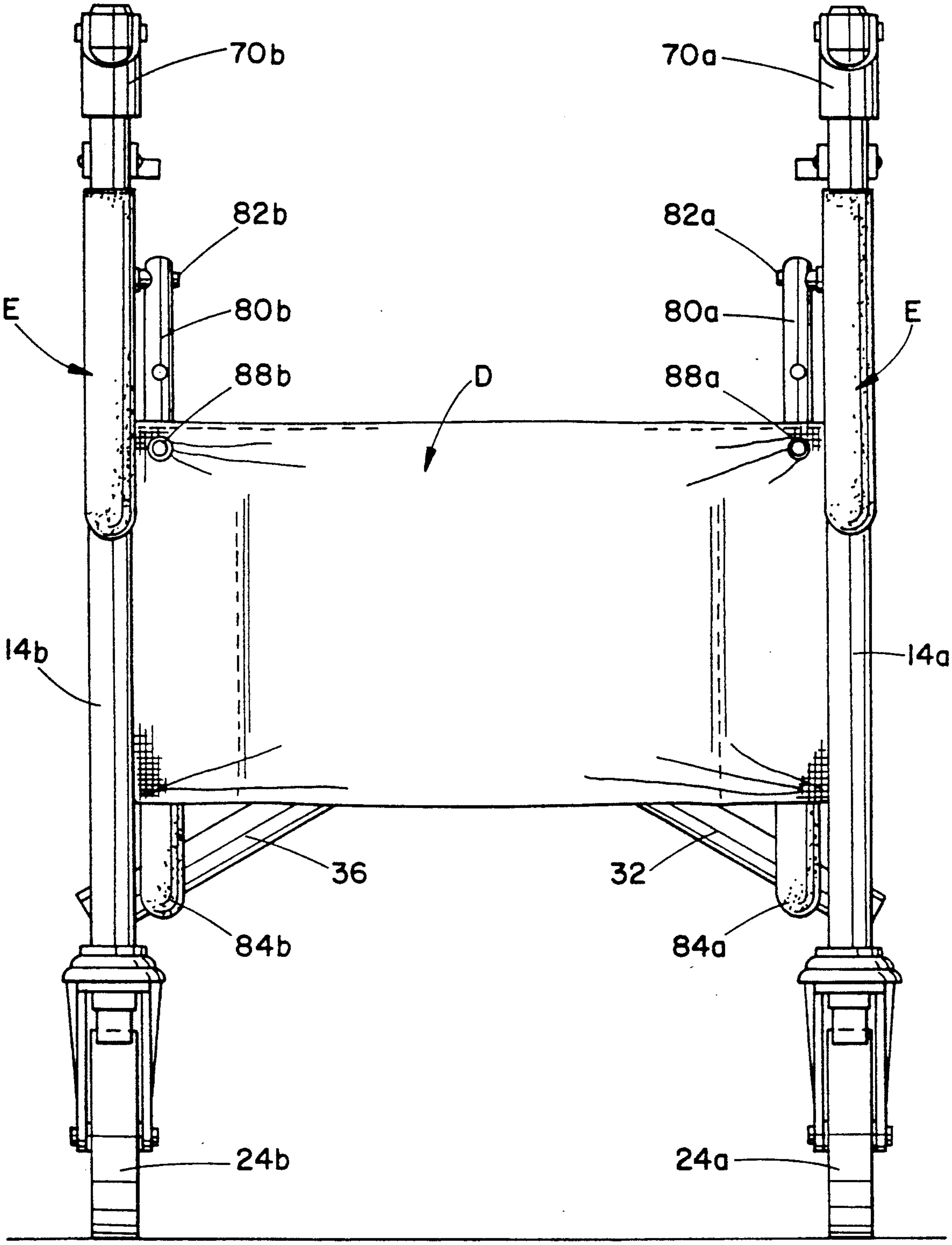
FIG. 9 is a rear view of the open wheelchair of FIGS. 7 and 8.

As will be understood, the wheelchair is typically stored in a confined area in the position shown in FIGS. 1-3. Pulling the frame portions away from one another, or pushing downwardly on the longitudinal members 42, 48, spreads the frame portions from the stored position of FIGS. 1-3, through the configuration shown in FIGS. 4—6, and toward the open position of FIGS. 7-9. At that point, connecting members 60, 62 have passed their over-center position and lock the frame portions in spaced, substantially parallel relation as shown.

Figure 10:
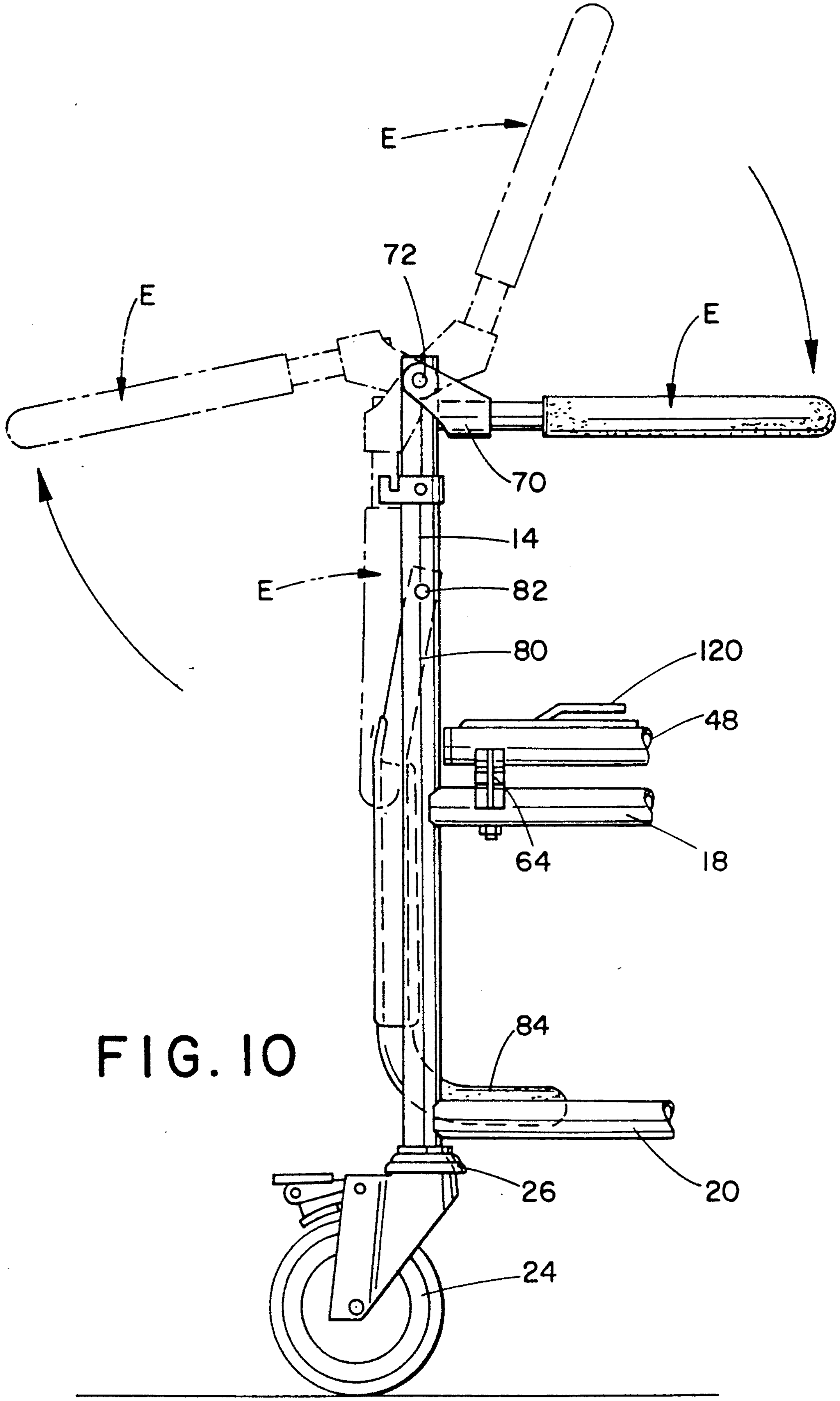
FIG. 10 is a partial side elevational view illustrating movement of the armrests from a stored to an operative position.

Operation of the armrests E is more particularly shown in FIG. 10. As illustrated there, an offset flange 70 is secured to a first or inner end of the armrest and pivotally secured by bolt or other fastener 72 for rotational movement through a range of approximately 270°. As illustrated, the pivot point defined by the fastener is disposed adjacent the terminal end of the first vertical member 14 for reasons which will become apparent below.

The armrests are initially stored in generally parallel relation with the first vertical members 14*a*, 14*b*. Each armrest is then rotated through approximately 270°, and extends generally perpendicular from the vertical members 14*a*, 14*b* and in a plane spaced generally parallel and above the plane defined by the seat portion C. Thus, the armrests do not extend upwardly above the frame portions except during intermediate stages of assembly. This reduces the overall height of the chair, particularly in the stored position, and yet provides a user with armrests if desired.

Figure 11:
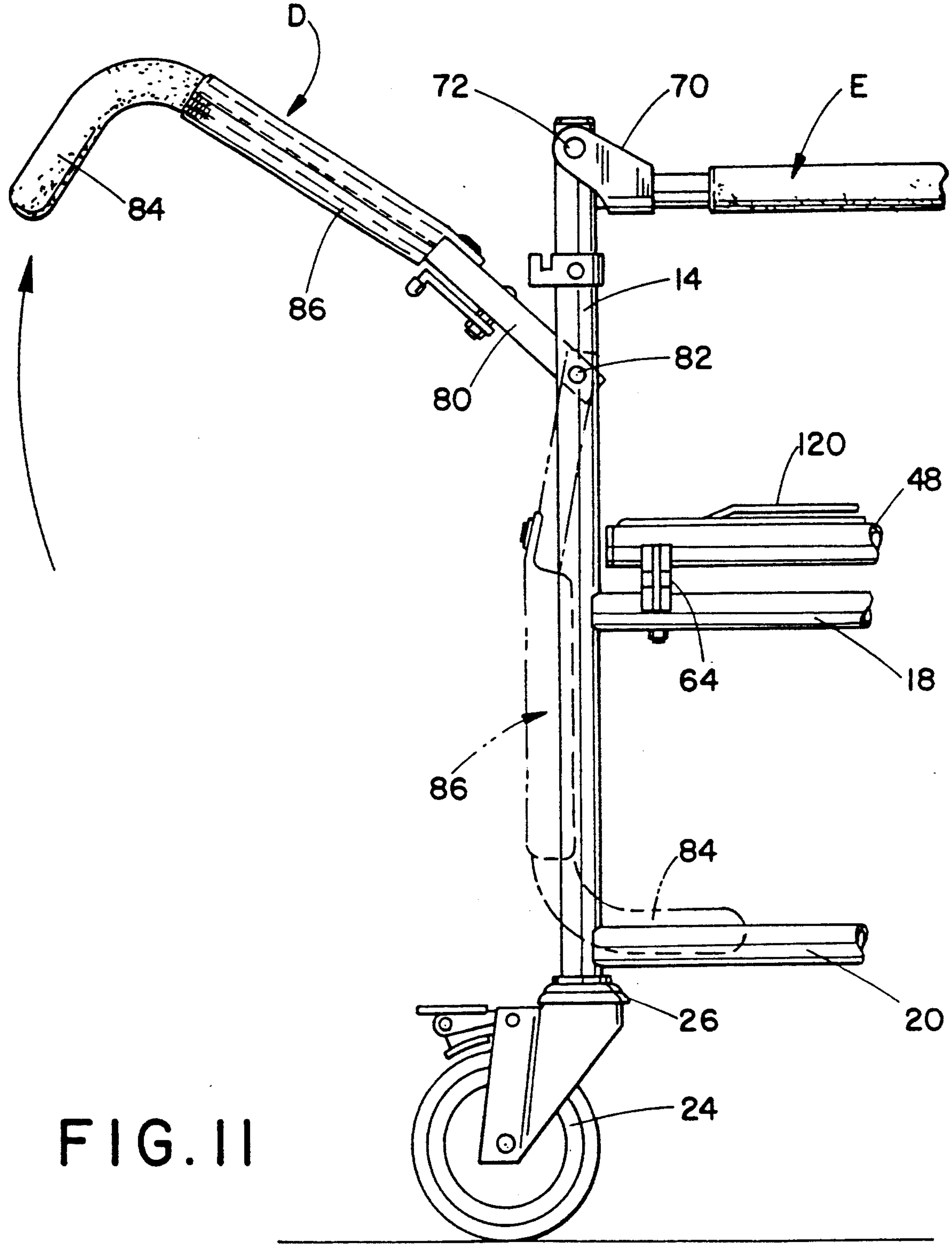
FIG. 11 is a partial side elevational view illustrating movement of the seat back from a stored to an operative position.
Figure 12:
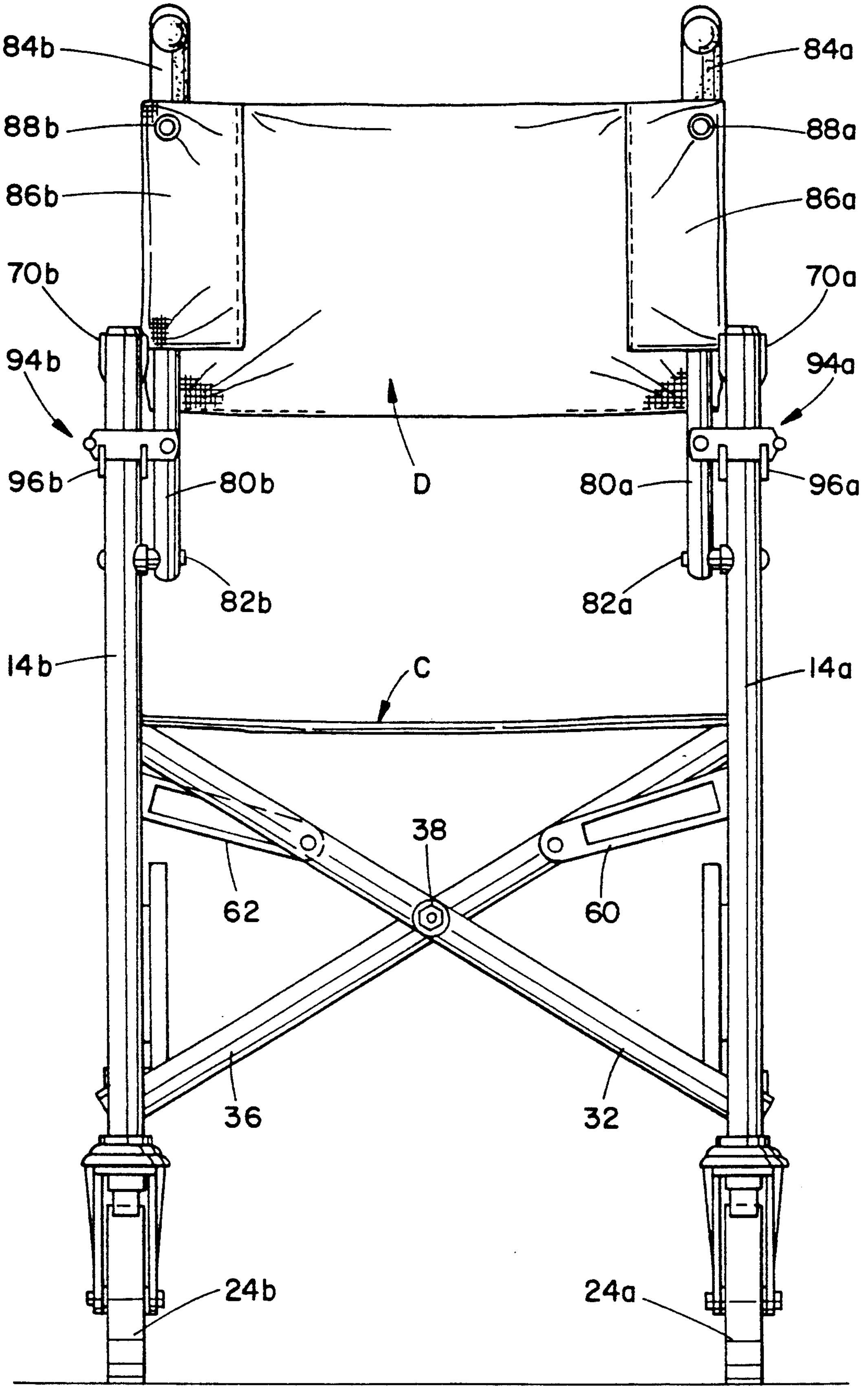
FIG. 12 is a rear view of the wheelchair in an open position particularly showing the seat back in a full upright or operative position.

In the next stage of assembly, seat back D is rotated from its storage position (FIGS. 2 and 5) toward an operative position as shown in FIGS. 11 and 12. An elongated bar member 80 is rotatably secured by pin 82 to the first vertical member 14 of the frame portion at a location inwardly of the armrest pin location 72. The opposite end of the bar member extends through an angle of approximately 90° to define a handle portion 84. Thus, the bar members 80*a*, 80 *b* are originally oriented in parallel relation with vertical members 14*a*, 14*b* with the handle portions 84*a*, 84*b* disposed downwardly and adjacent the rear wheel 24*a*, 24*b*. Thereafter, the bar members are rotated about pins 82*a*, 82*b* as shown in FIG. 11 to the upright position generally illustrated in FIG. 12. In that position, the bar members are again oriented generally parallel to the vertical members 14. In other words, the seat back pivots through a range of approximately 180°.

The flexible material comprising the seat back D is folded along opposite edges to define sleeve portions 86. The bar member extends through the sleeve portion and the two are secured together by means of fasteners 88.

Figure 13:
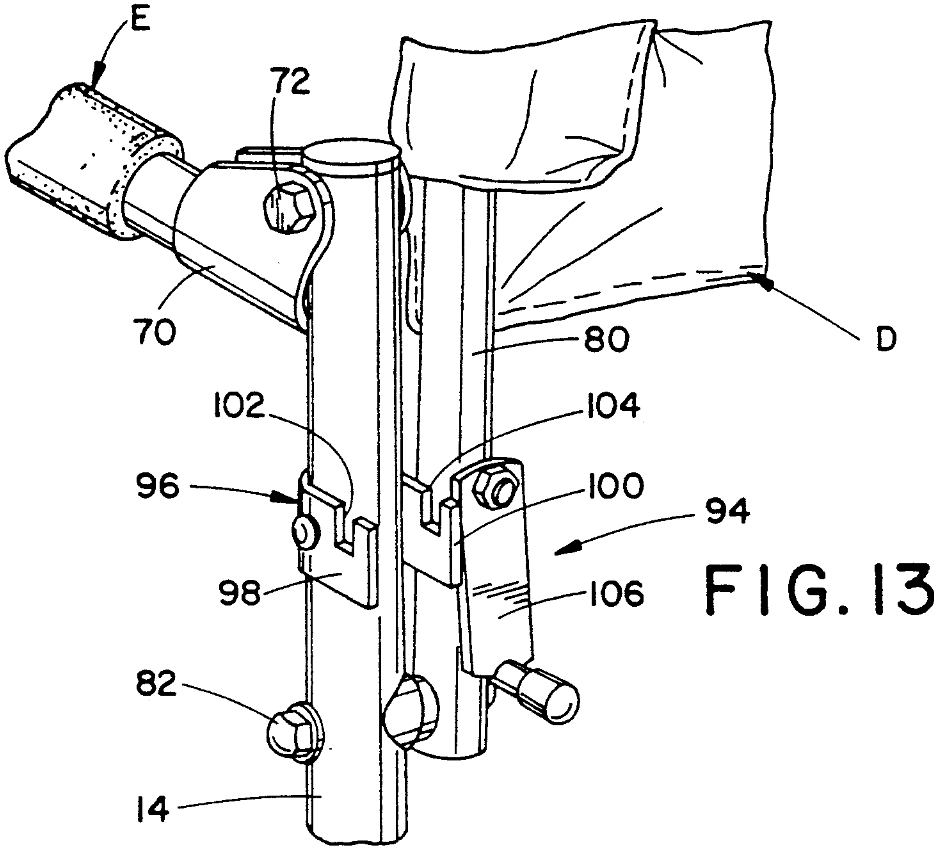
FIG. 13 is a detailed view of the locking means for the seat back in an unlocked position.
Figure 14:
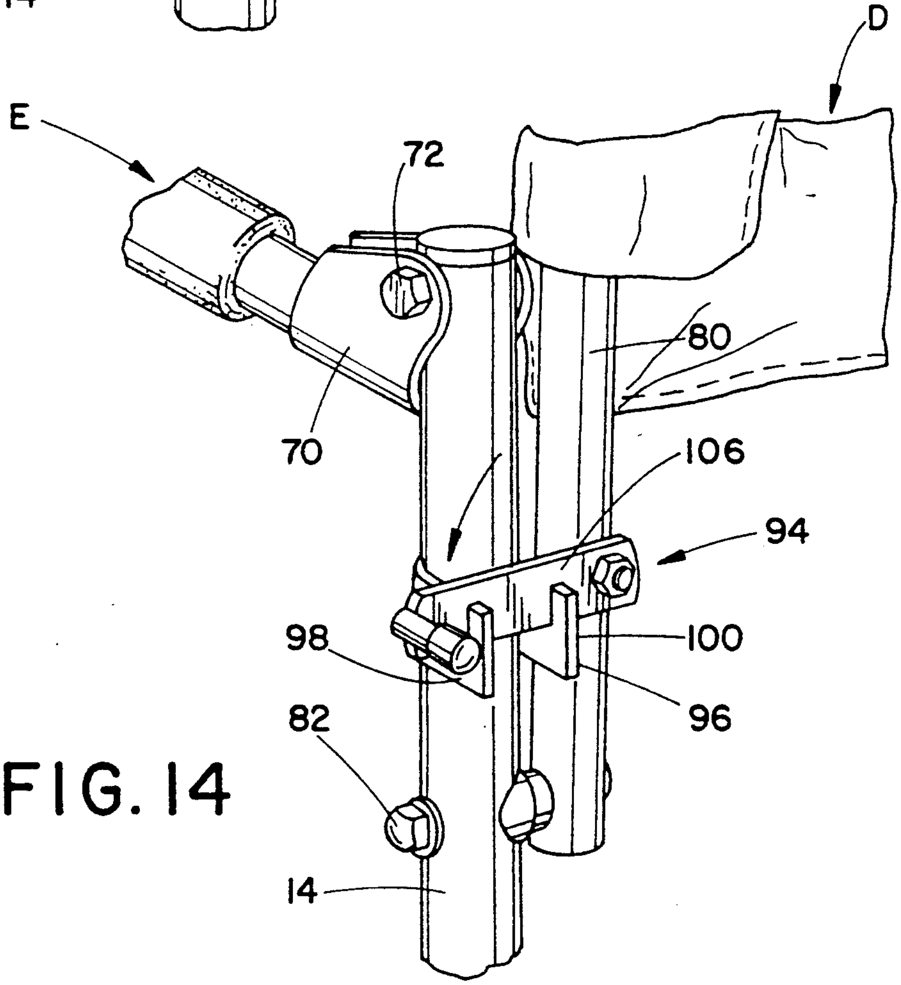
FIG. 14 is a detailed view of the locking means for the seat back in a locked position.

As best illustrated in FIGS. 12–14, once the seat back D is raised to its upper, operative position, a locking means 94 maintains the seat back in position. Specifically, the locking means includes a U-shaped strap 96 secured to the vertical member 14 at an area axially outward from pin 82 and axially inward of pin 72. Legs 98, 100 of the strap extend generally perpendicularly outward from the frame member 14. The configuration of the legs accommodates the armrest when it is stored as shown in FIGS. 1–9. The legs also include aligned recesses 102, 104 (FIG. 13). The recesses are adapted to receive a latch member 106, pivotally mounted on the bar member so. The latch member, When received in the recesses 102, 104, prevents further rotation of the seat back from its operative position.

Figure 15:
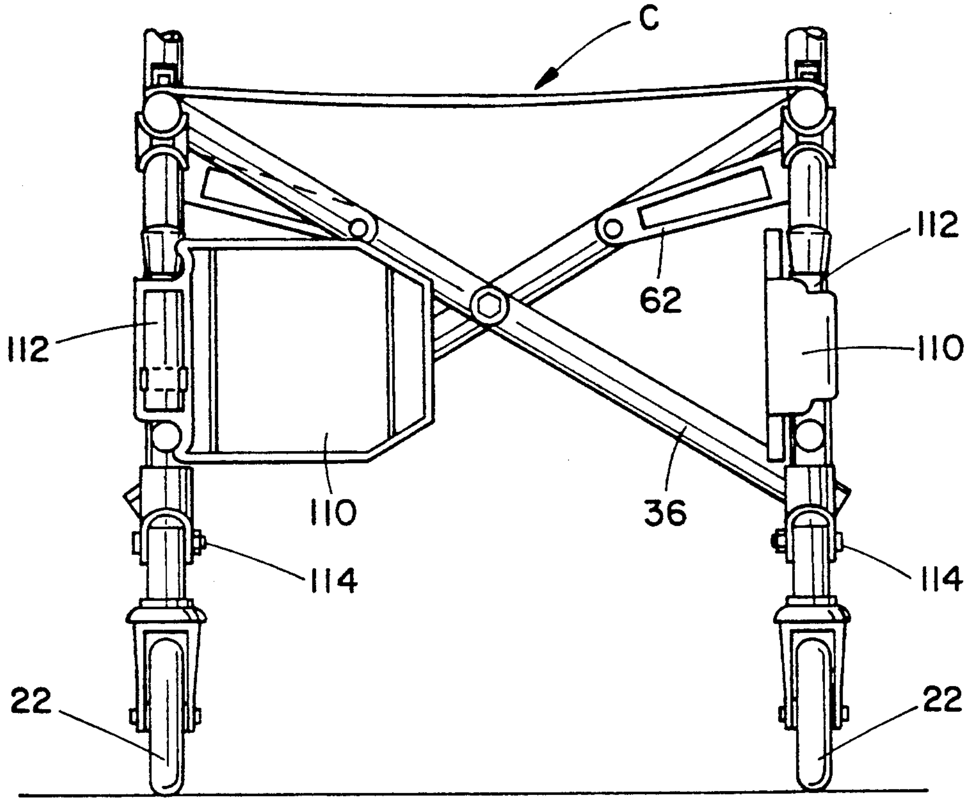
FIG. 15 is a front view detailing initial steps in moving the footrests from a stored to an operative position.
Figure 16:
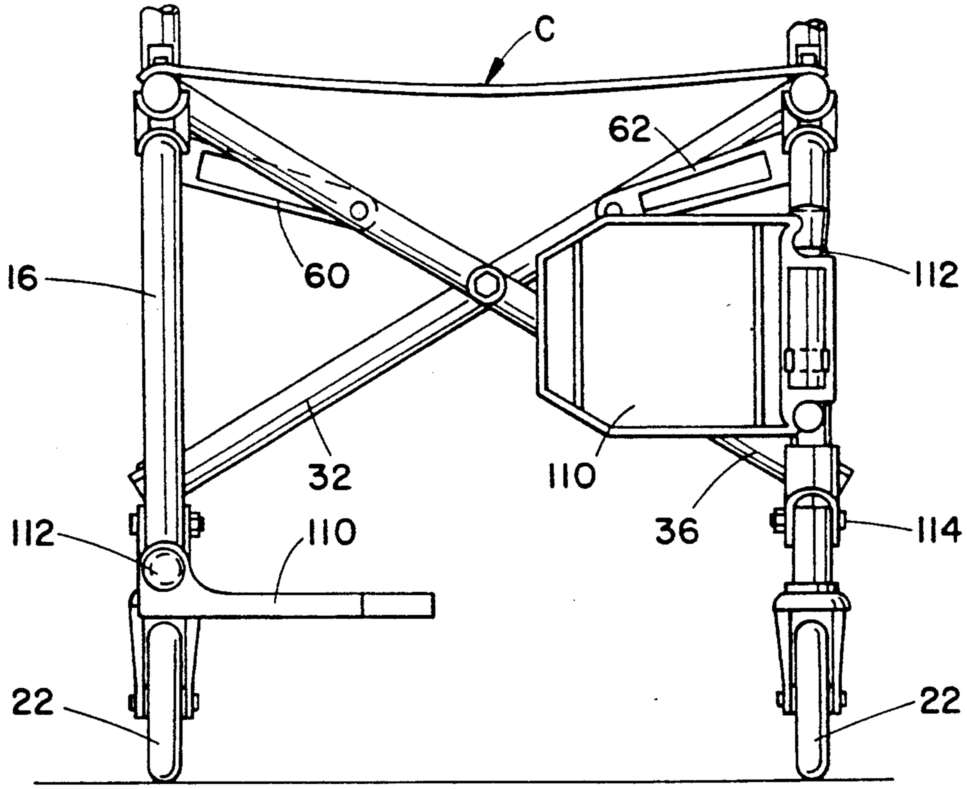
FIG. 16 is a front view illustrating intermediate steps in moving the footrests toward an operative position.
Figure 17:
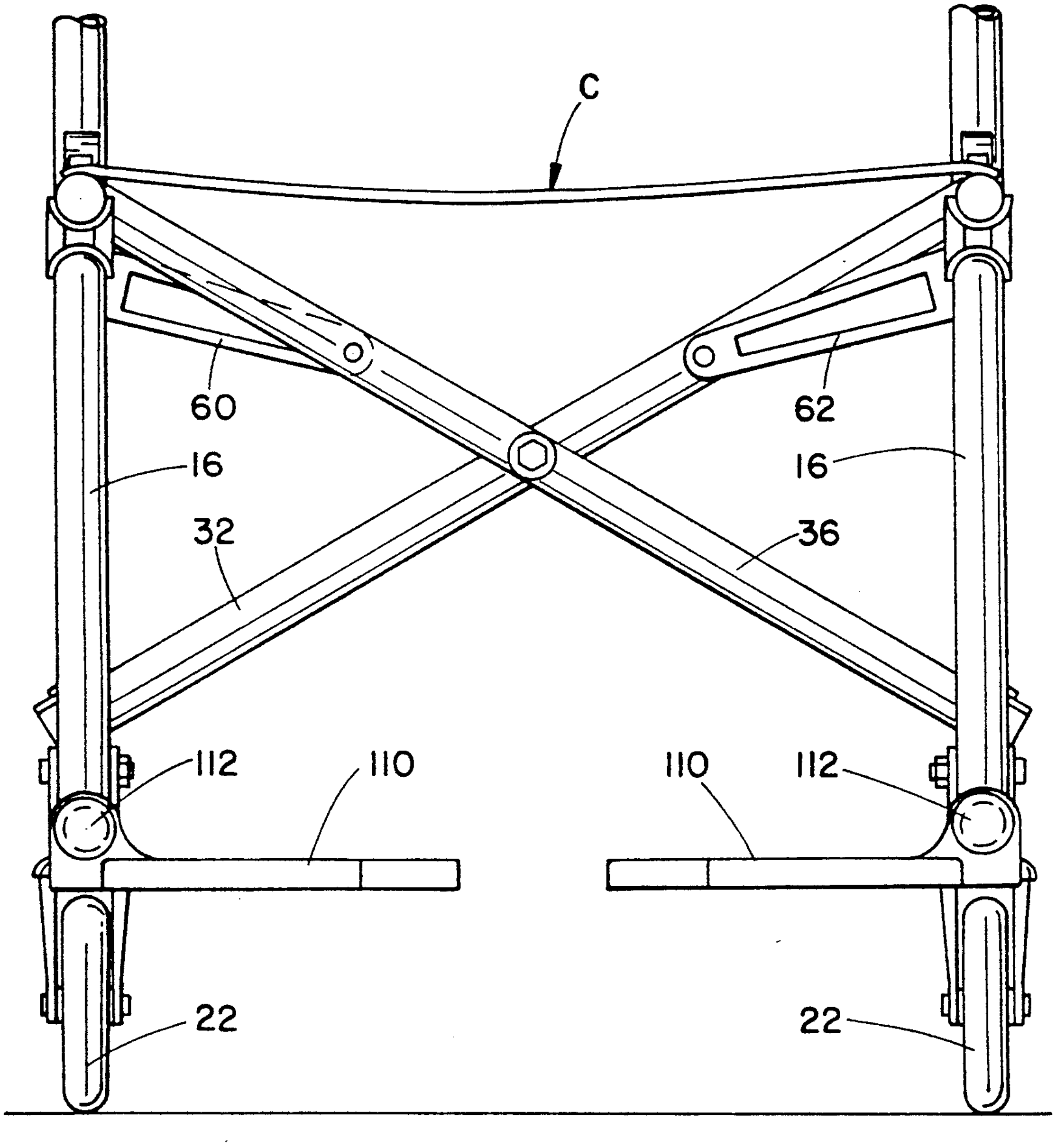
FIG. 17 is a front view showing the footrests in a fully operative position; and, FIG. 18 is a side elevational view of a fully open and operative wheelchair.

Lastly, each footrest F has a plate 110 that pivots about tubular member 112. The tubular member, in turn, pivots through approximately 90° about pin 114 at the base of the second vertical member 16. Thus, as shown in FIG. 15, plate 110 is rotated through approximately 90° about tubular member 112. Thereafter, plate 110 and the tubular member 112 is pivoted approximately 90° about pin 114*a* to the operative position shown in FIG. 17. This orients the plate to support the soles of a user's foot if desired. Alternatively, the footrests can remain in their original, stored position particularly illustrated in FIG. 7.

Figure 18:
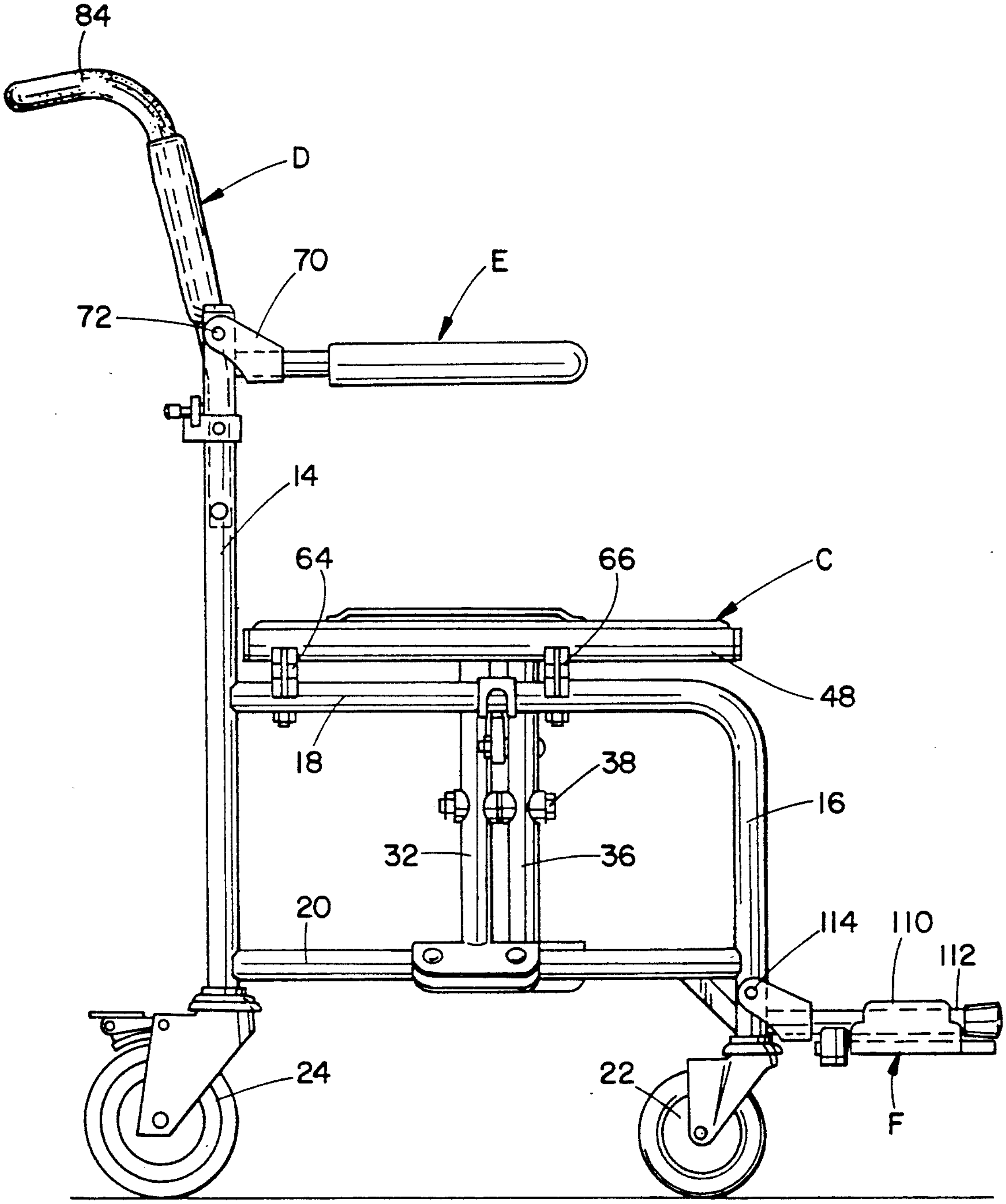

Again, in summary, the assembled wheelchair is shown in FIG. 18. The frame portions 12*a*, 12*b* are spaced apart by the cross members 32, 36. This positions the connecting members 60, 62 in their over-center position to maintain the open position. Each armrest is then rotated through approximately 270° so as to extend generally perpendicular to vertical member 14. Thereafter, the seat back is rotated in a clockwise direction (as shown) to an upright, operative position. The latch members 106 associated with each bar member are then positioned in recesses 102, 104. This maintains the seat back in an operative position. Additionally, if desired, the footrests can be moved to an operative position through a two-step process.

Collapsing the wheelchair is also simply performed. First, the footrests are pivoted to their stored position. The latch members 106 are rotated from the strap 94 and the seat back pivoted to its stored position. Thereafter, the armrests can be rotated to their stored position alongside the frame member 14. Handle straps 120 are provided on the seat portion C to aid in lifting the members 42, 48 upwardly and urge the frame portions toward one another. Once the wheelchair has attained its fully collapsed position of FIGS. 1–3, the handle straps 120 can be used to carry the wheelchair, or grasp the wheelchair as it rolls on wheels 22, 24.

In accordance with the description of the preferred embodiment, a wheelchair has been manufactured having the following specifications:

OPEN: 17½"W×30"L
COLLAPSED: 28"H
CUBIC FT.: 2.34
WEIGHT/LBS: 20.8
SEAT (OPEN): 16W×16D

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A collapsible, attended wheelchair having a low profile for storage purposes and opening to an operative position for receiving an occupant to be pushed by an attendant, the wheelchair comprising:

- a frame having first and second rigid frame portions each having an upright post with an outer end, the upright posts being disposed adjacent one end of the frame;
- means for collapsibly interconnecting the first and second frame portions together whereby the frame portions are spaced from one another in an open, first position and substantially adjacent one another in a collapsed, second position;
- wheels secured to the frame;
- a collapsible seat portion extending between the frame portions;
- first and second arm rests being pivotally secured to the first and second frame portions, respectively, at the outer ends of the posts for angular movement through approximately 270 degrees;
- a collapsible seat back pivotally secured on opposite edges to the upright posts of the first and second frame portions for selective positioning between a first position below the seat portion and a second position above the seat portion; and
- means for selectively latching the seat back in the second position.

2. The wheel as defined in claim 1 wherein the latching means includes a latch member secured to one of the frame and the seat back, and a bracket secured to the other of the frame and the seat back.

3. The wheelchair as defined in claim 1 wherein the interconnecting means includes first and second members being pivotally secured to one another along a central portion, a first end of each member secured to the seat portion, and a second end of each member being secured to the frame.

4. The wheelchair as defined in claim 3 wherein the interconnecting means further includes third and fourth members having a first end secured to the first and second frame portions, respectively, and second ends secured to the first and second members, respectively.

5. A collapsible, attended wheelchair having a low profile in a collapsed condition and opening to an operative position for receiving an occupant to be pushed by an attendant, the wheelchair comprising:

a frame including substantially identical first and second frame portions, each frame portion having a pair of generally horizontally disposed frame members maintained in spaced relation by a generally vertically disposed frame member;

a collapsible seat portion extending between the frame portions;

first and second arm rests pivotally secured to the first and second frame portions, respectively, each arm rest being rotatable through approximately 270 degrees from a first position stored in generally parallel relation with the vertically disposed frame member to a second position spaced above the horizontal frame member and generally perpendicular to the vertical frame member;

a collapsible seat back pivotally secured to the frame and being rotatable through approximately 180 degrees from a first position stored beneath the seat portion to an upright second position above the seat portion;

means for selectively latching the seat back in the second position;

first and second members pivotally secured to one another in a generally X-shaped arrangement having first ends pivotally secured to one of the frame portions and second ends pivotally secured to one edge of the seat portion, third and fourth members have a first end pivotally secured to one of the first and second members, and a second end pivotally secured to one of the first and second frame portions, whereby the first and second frame portions are spaced apart in an open first position and closely adjacent one another in a closed second position; and push handles secured to the seat back and extending rearwardly of the wheelchair in the seat back second position.

6. The wheelchair as defined in claim 5 further comprising foldable first and second footrests pivotally secured to the first and second frame portions, respectively.

7. A wheelchair comprising:

a frame having first and second frame portions;

a collapsible seat portion extending between the frame portions;

a collapsible seat back pivotally mounted on opposite sides to the frame portions for selective rotation of approximately 180 degrees between stored and operative positions;

first and second arm rests pivotally secured to the first and second frame portions, respectively, for selective rotation of approximately 270 degrees between stored and operative positions; and means for selectively locking the seat back in its operative position.

8. The wheelchair as defined in claim 7 wherein the frame portions each include generally vertical members to which the arm rests and seat back are pivotally secured, the arm rests being secured adjacent outer ends of the vertical members and the seat back being secured to the vertical members at an area inwardly thereof.

9. The wheelchair as defined in claim 7 wherein the arm rests extend through a portion of the locking means in their stored position.

10. A wheelchair comprising:

a frame having first and second frame portions;

means for collapsibly interconnecting the first and second frame portions together whereby the frame portions may be spaced from one another in an open, first position and substantially adjacent one another in a collapsed second position;

wheels secured to the frame;

a collapsible seat portion extending between the frame portions;

first and second arm rests pivotally secured to the frame for selective positioning between first and second positions, the first and second arm rests being rotatable in a plane defined by the first and second frame portions, respectively;

a collapsible seat back extending between the frame portions and being rotatably connected thereto for selective positioning between a storage, first position between the frame portions and an operative, second position extending outwardly from the frame portions, the seat back being collapsible independently of the first and second positions of the arm rests; and means for selectively latching the seat back in its second position.

11. A wheelchair comprising:

a frame having first and second frame portions;

means for collapsibly interconnecting the first and second frame portions together whereby the frame portions may be spaced from one another in an open, first position and substantially adjacent one another in a collapsed, second position;

wheels secured to the frame;

a collapsible seat portion extending between the frame portions;

first and second arm rests pivotally secured to the frame for selective positioning between first and second positions, the arm rests being rotatable through approximately 270 degrees;

a collapsible seat back extending between the frame portions and being rotatably connected thereto for selective positioning between a storage, first position between the frame portions and an operative, second position extending outwardly from the frame portions, the seat back being collapsible independently of the first and second positions of the arm rests; and means for selectively latching the seat back in its second position.

12. A wheelchair comprising:

a frame having first and second frame portions;

means for collapsibly interconnecting the first and second frame portions together whereby the frame portions may be spaced from one another in an open, first position and substantially adjacent one another in a collapsed, second position;

wheels secured to the frame;

a collapsible seat portion extending between the frame portions;

first and second arm rests pivotally secured to the frame for selective positioning between first and second positions, the first and second arm rests being rotatable in a plane defined by the first and second frame portions, respectively;

a collapsible seat back extending between the frame portions and being rotatably connected thereto for selective positioning between a storage, first position between the frame portions and an operative, second position extending outwardly from the frame portions, the seat back being collapsible independently of the first and second positions of the arm rests;

means for selectively latching the seat back in its second position; and wherein the overall height of the wheelchair when the seat back is rotated to the storage position and the frame is in the collapsed position is approximately twenty-eight inches.

13. A wheelchair comprising:

a frame having first and second frame portions;

means for collapsibly interconnecting the first and second frame portions together whereby the frame portions may be spaced from one another in an open, first position and substantially adjacent one another in a collapsed, second position;

wheels secured to the frame;

a collapsible seat portion extending between the frame portions;

first and second arm rests pivotally secured to the frame for selective positioning between first and second positions, the first and second arm rests being rotatable in a plane defined by the first and second frame portions, respectively;

a collapsible seat back extending between the frame portions and being rotatably connected thereto for selective positioning between a storage, first position between the frame portions and an operative, second position extending outwardly from the frame portions, the seat back being collapsible independently of the first and second positions of the arm rests;

means for selectively latching the seat back in its second position; and wherein the overall weight is approximately twenty pounds.

14. A wheelchair comprising:

a frame having first and second frame portions;

means for collapsibly interconnecting the first and second frame portions together whereby the frame portions may be spaced from one another in an open, first position and substantially adjacent one another in a collapsed, second position;

wheels secured to the frame;

a collapsible seat portion extending between the frame portions, the first and second arm rests being rotatable in a plane defined by the first and second frame portions, respectively;

first and second arm rests pivotally secured to the frame for selective positioning between first and second positions;

a collapsible seat back extending between the frame portions and being rotatably connected thereto for selective positioning between a storage, first position between the frame portions and an operative, second position extending outwardly from the frame portions, the seat back being collapsible independently of the first and second positions of the arm rests;

means for selectively latching the seat back in its second position; and wherein the width of the wheelchair in the frame open position is approximately seventeen and one-half inches.

* * * * *